Figure 1:
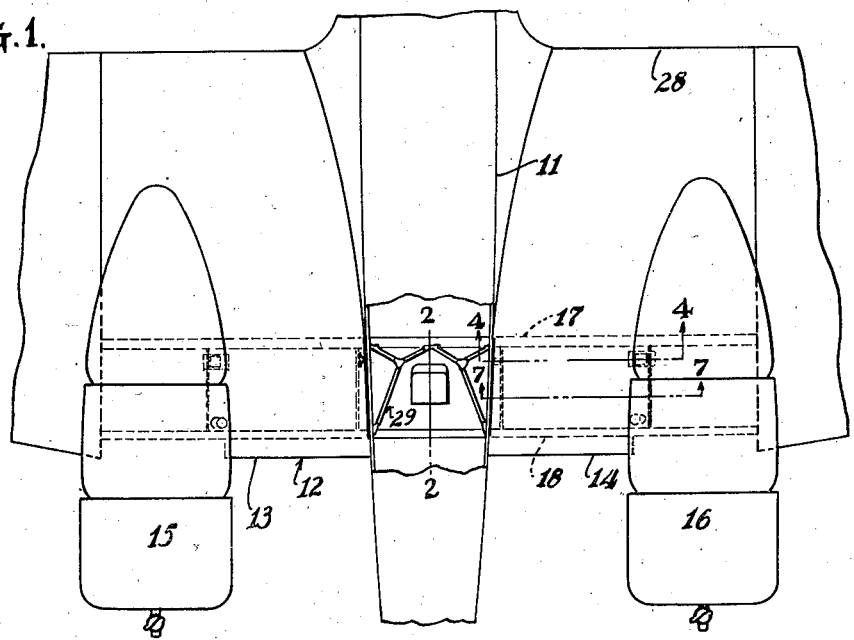

March 14, 1939.  F. E. FLADER  2,150,546
WING STRUCTURE
Filed Oct. 14, 1936  3 Sheets-Sheet 1

INVENTOR.
FREDRIC E. FLADER
BY
ATTORNEY.

INVENTOR.
FREDRIC E. FLADER

March 14, 1939.  F. E. FLADER  2,150,546
WING STRUCTURE
Filed Oct. 14, 1936  3 Sheets-Sheet 3
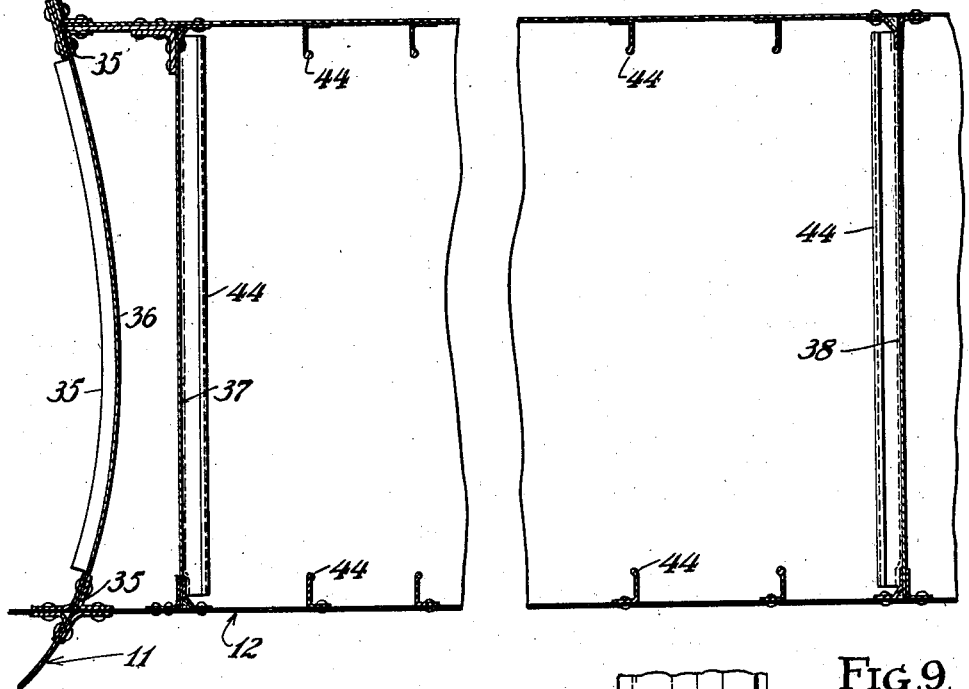
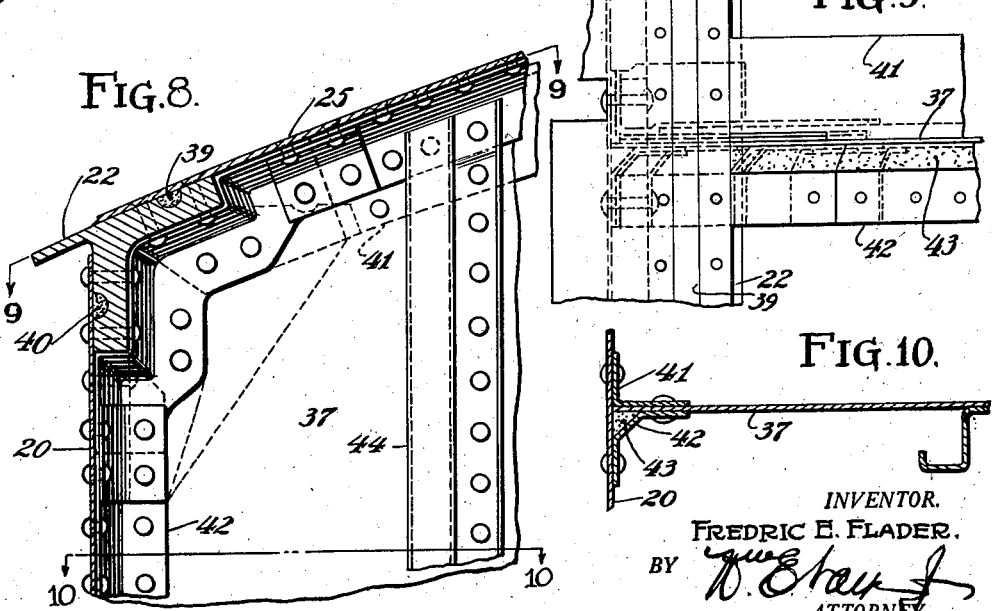
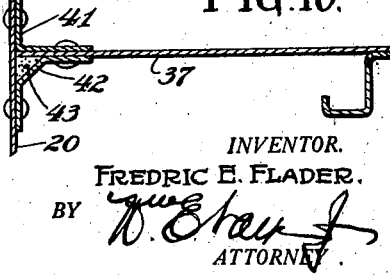
INVENTOR.
FREDRIC E. FLADER.
BY
ATTORNEY.

Patented Mar. 14, 1939

2,150,546

UNITED STATES PATENT OFFICE

2,150,546

WING STRUCTURE

Fredric E. Flader, Kenmore, N. Y., assignor, by mesne assignments, to Curtiss-Wright Corporation, a corporation of New York Application October 14, 1936, Serial No. 105,462

1 Claim. (Cl. 244—117)

This invention relates to aircraft and is particularly concerned with improvements in the wing and fuselage structure in aircraft of that type in which the structural elements and covering are fabricated entirely from metal.

The type of aircraft to which this invention particularly relates is that which is known as a mid-wing monoplane, wherein the wings extend laterally outward from the fuselage sides substantially mid-way between the top and bottom surfaces of the fuselage. A substantial aerodynamic improvement flows from a structure of this kind, since it is possible to make the lines of the aircraft very clean in order to reduce the drag of the craft and consequently to increase its speed.

In cantilever monoplane wings, it is necessary to carry the wing structure through the fuselage continuously from wing tip to wing tip, due to the differential torque reactions on the wings at opposite sides of the fuselage. By making the whole wing unit a substantially unitary structure, attachment of the wing to the fuselage becomes a relatively simple matter and the differential torsional and lift reactions on each side of the fuselage are then taken care of in the wing structure rather than in the attachment means of the wing to fuselage.

In such a unitary wing structure, where the wing covering is utilized to assume part of the stress, it will be apparent that ordinarily it would be desirable to carry the stressed wing covering through the fuselage. However, the closed wing structure within the fuselage takes up an amount of space which can be ill afforded, since it is desirable to utilize this space for other purposes. In the present embodiment, it is desired to utilize part of the volumetric space of that part of the wing which is inside the fuselage for accommodation of the aircraft crew.

An object of the invention therefore is to provide means for forming that part of the cantilever wing which occupies an aircraft fuselage in such a manner as to provide increased available space within the fuselage. A further object is to provide a stressed skin wing having braces in certain portions thereof to replace removed portions of the skin. Still a further object of the invention is to provide a novel form of composite wing spar. A further object is to provide a box type wing spar, a part of which is adapted to form, with suitable partitions, tankage space for fuel. A further object of the invention is to utilize the normal structural members of a wing to perform a dual function, in first assuming wing loads and second in forming the bordering elements of a fuel tank.

Figure 2:
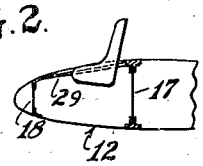
Figure 3:
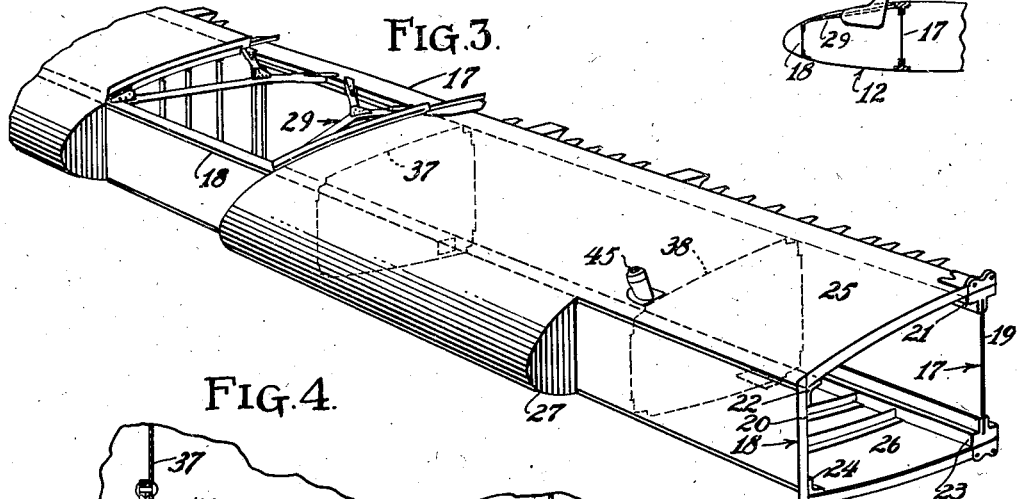
Figure 4:
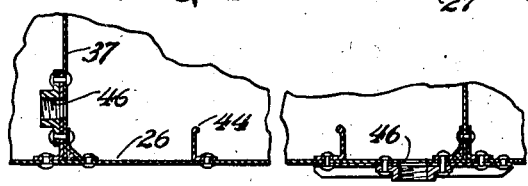
Figure 5:
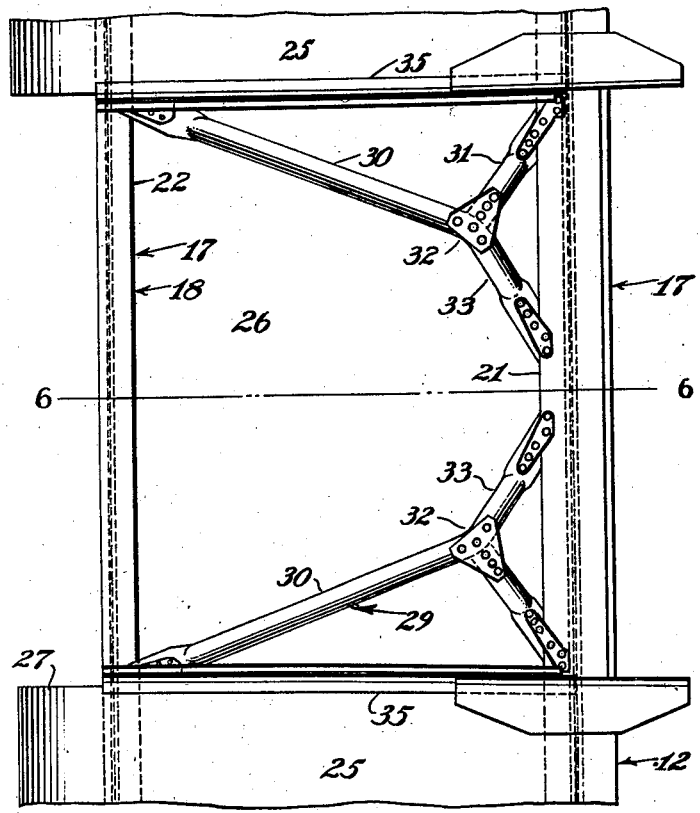
Figure 6:
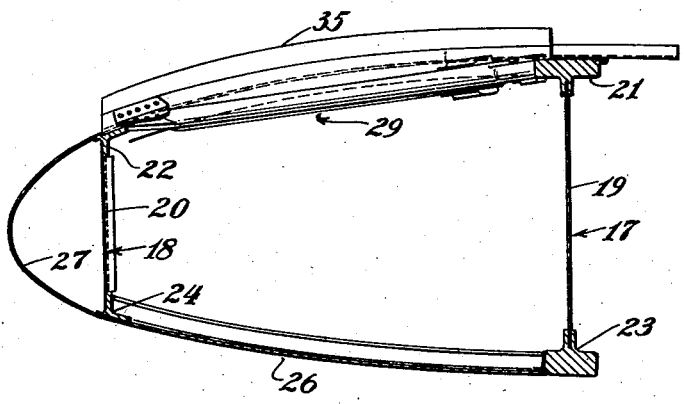

An understanding of the details of the invention may be gained by reading the annexed specific description and in viewing the drawings in which:

Fig. 1 is a plan of the central part of an aircraft wing and fuselage constructed according to the invention, Fig. 2 is a section on the line 2—2 of Fig. 1, Fig. 3 is a perspective view of a portion of the aircraft wing, Fig. 4 is a fragmentary section on the line 4—4 of Fig. 1, Fig. 5 is an enlarged fragmentary plan of the central part of the wing structure including the bracing of this invention, Fig. 6 is a section on the line 6—6 of Fig. 5, Fig. 7 is a section on the line 7—7 of Fig. 1, Fig. 8 is an enlarged fragmentary section through part of the wing spar and, Figs. 9 and 10 are sections on the lines 9—9 and 10—10 respectively of Fig. 8.

Referring to the drawings. I provide a metal fuselage 11 having a cantilever wing system 12 attached thereto, lateral wing portions 13 and 14 respectively extending out from the fuselage from substantially the middle part of said fuselage. The panels 13 and 14 carry power plant units 15 and 16 in the conventional manner.

The wing system 12 comprises a main wing beam 17 extending between the power plant units 15 and 16, through the fuselage 11, this beam 17 being located approximately 35 per cent of the distance from the wing leading edge to the wing trailing edge. An auxiliary wing beam 18 is located forward of the main beam 17, both the beams 17 and 18 comprising web plates 19 and 20 respectively provided with chord elements 21 and 22 respectively at their upper edges, and 23 and 24 respectively at their lower edges. The elements 21 and 22 are joined by a metal plate 25 and similarly, the elements 23 and 24 are joined by a metal plate 26, the plates 25 and 26 thereby forming, with the beams 17 and 18, a unitary box spar. The plates 25 and 26 also form a part of the outer airfoil section covering, the balance of the wing structure extending forwardly and rearwardly from the composite box spar to form, respectively, leading edge portions 27 and trailing edge portions 28.

It should be noted that the beams 17 and 18 extend continuously through the fuselage 11 and as normally practiced, the lower plate 26 between the beams may be left intact within the fuselage II. However, the upper plate 25, joining the beams 17 and 18, is removed within the fuselage II so that the space within the spar, within the fuselage, is available for use. It will be realized that the plate 25 serves a useful function as part of the wing structure and since it is omitted within the fuselage, a skeleton bracing 29 is substituted therefor, so that torsional reactions between the panels 13 and 14 may be assumed by the wing structure alone without these stresses being imparted to the fuselage. This bracing, as is best shown in Fig. 5, comprises tubular members 30 extending rearwardly and inwardly from the juncture of the chord 22 and the plate 25. Similarly, elements 31 extend inwardly and forwardly from the juncture of the chord 21 and the plate 25 to intersect the elements 30 at points 32. These points 32 are in turn connected by brace elements 33 to the mid-portion of the chords 21, whereby the bracing system comprising the elements 30, 31 and 33 makes an effective substitute for the plate 25 which otherwise would pass through the fuselage, permitting utilization of the space within the box spar.

It will be understood that the said spar comprises the principle structural element of the wing, the leading and trailing edge portions 27 and 28 being attached to the spar outside of the fuselage to comprise the required airfoil form of the wing system per se.

The wing system is attached to the fuselage, as shown in Fig. 7, by suitable angle members 35 joined respectively to the fuselage covering 36, the plates 25 and 26, and the beam webs 19 and 20.

It will be appreciated that the webs 19 and 20 with the plates 25 and 26, outside of the fuselage, provide a strong box unit occupying a considerable volumetric space. This space may properly be utilized for fuel tankage for the aircraft by the provision of appropriate partitions 37 and 38, between the fuselage 11 and the respective engine units 15 and 16. Figs. 7 to 10 inclusive show the detailed attachment of the partitions 37 and 38 to the spar structure, the several joints involved being made liquid tight as is obviously necessary for fuel tankage. In referring to Fig. 8 it will be noted that the beam chord element 22 is grooved at 39 and 40, the grooves being covered by the plate 25 and the web 20 respectively. The grooves are then filled by suitable injection apparatus with a plastic compound to effect a fluid tight seal between the members. Similar grooves are provided in the other chord elements 21, 23 and 24, so that fluid tight joints may be made thereat. Fig. 10 shows the typical means of attaching the partitions 37 (or 38) to the web 20 (or to the plates 25 or 26, or to the web 19). The partition 37 is in end abutment with the web 20, and angle members 41 and 42 are suitably attached as by rivets to the elements 37 and 20. The angle member 42 is formed with a large fillet so that when assembled a substantially triangular space 43 is formed by the several members which are joined together. After assembly of the various members, the space 43 is filled with a plastic composition to provide a fluid tight seal at the joint.

It will be understood that the same character of joint is made throughout the periphery of the partitions 37 and 38. Stiffeners 44 are attached to the several members 37, 38, 25, 26, 19 and 20 to prevent bulging of these members under the weight of liquid fuel contained in the tank. A conventional filler opening 45 may be provided for each tank, as shown in Fig. 3, and suitable drain and gauge fittings 46 may be let through the tank members and attached thereto.

In the above description the interference has been that the beams 17 and 18 extend continuously from wing tip to wing tip. These beams may, if desired, extend only between the power units 15 and 16, and separate wing tip sections may be bolted to the ends of the beams in a manner well known in the art, to provide for more easy assembly, disassembly and storage of the aircraft. Such difference in construction, however, has no material effect upon the invention, the essence of which is the provision of tankage space within the box spar, and the provision of a unitary central spar portion for the aircraft, capable of sustaining torsional loads which may be imposed thereon without the necessity of complicated joints and bracing organization. As previously pointed out this latter phase of the invention provides useful space which might otherwise be occupied by the center part of the wing alone within the fuselage.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

What I claim is:

In aircraft, a fuselage, main and auxiliary wing spars in spaced relation extending therethrough, and a skeleton bracing system, between said spars and within said fuselage, said system comprising members extending inwardly from the junctures of the spars and fuselage sides to intersections, and members extending from said intersections to the mid-point, between the fuselage sides, of one of said spars.

FREDRIC E. FLADER.